United States Patent
Tomonari et al.

(10) Patent No.: US 10,374,276 B2
(45) Date of Patent: Aug. 6, 2019

(54) WIRE, MANUFACTURING METHOD THEREFOR, AND COIL COMPONENT

(71) Applicant: TDK Corporation, Tokyo (JP)

(72) Inventors: Toshio Tomonari, Tokyo (JP); Hirohumi Asou, Tokyo (JP); Kosuke Kunitsuka, Tokyo (JP)

(73) Assignee: TDK CORPORATION, Tokyo (JP)

(*) Notice: Subject to any disclaimer, the term of this patent is extended or adjusted under 35 U.S.C. 154(b) by 130 days.

(21) Appl. No.: 15/615,049

(22) Filed: Jun. 6, 2017

(65) Prior Publication Data

US 2017/0358391 A1 Dec. 14, 2017

(30) Foreign Application Priority Data

Jun. 14, 2016 (JP) .................. 2016-117592

(51) Int. Cl.
| | | |
|---|---|---|
| *H01P 3/06* | (2006.01) | |
| *H01P 11/00* | (2006.01) | |
| *H01B 11/18* | (2006.01) | |
| *H01F 27/29* | (2006.01) | |
| *H01G 11/36* | (2013.01) | |
| *H01G 11/48* | (2013.01) | |
| *H01F 5/00* | (2006.01) | |
| *H01F 5/06* | (2006.01) | |
| *H01F 27/28* | (2006.01) | |
| *H01B 1/02* | (2006.01) | |

(Continued)

(52) U.S. Cl.
CPC .............. *H01P 3/06* (2013.01); *H01B 1/026* (2013.01); *H01B 11/1817* (2013.01); *H01F 5/00* (2013.01); *H01F 5/06* (2013.01); *H01F 27/2823* (2013.01); *H01F 27/29* (2013.01); *H01F 27/292* (2013.01); *H01G 11/36* (2013.01); *H01G 11/48* (2013.01); *H01P 11/005* (2013.01); *H01B 3/18* (2013.01); *H01F 27/00* (2013.01); *H01F 30/00* (2013.01)

(58) Field of Classification Search
CPC ........ H01F 27/29; H01F 5/06; H01F 27/2823; H01F 5/00; H01F 27/292; H01F 27/00; H01F 30/00; H01B 1/026; H01B 11/1817; H01B 3/18; H01G 11/36; H01G 11/48; H01P 3/06; H01P 11/005
USPC ............................................ 333/1, 160, 243
See application file for complete search history.

(56) References Cited

U.S. PATENT DOCUMENTS

| | | | | |
|---|---|---|---|---|
| 4,816,618 A | * | 3/1989 | Bongianni | ......... H01B 11/1808 156/50 |
| 5,339,058 A | * | 8/1994 | Lique | .................. H01Q 13/203 333/237 |

(Continued)

FOREIGN PATENT DOCUMENTS

JP        2004-153079        5/2004

OTHER PUBLICATIONS

Machine English Translation of JP2004-153079 A Published on May 27, 2004 (Year: 2004).*

*Primary Examiner* — Rakesh B Patel
*Assistant Examiner* — Jorge L Salazar, Jr.
(74) *Attorney, Agent, or Firm* — Young Law Firm, P.C.

(57) ABSTRACT

Disclosed herein is a wire that includes: a core wire made of a conductor; an insulating film covering an outer periphery of the core wire; a catalyst adsorption film covering an outer periphery of the insulating film, the catalyst adsorption film including a catalyst serving as a reaction start point of electroless plating; and an outer periphery conductor covering an outer periphery of the catalyst adsorption film.

10 Claims, 2 Drawing Sheets

(51) Int. Cl.
*H01F 27/00* (2006.01)
*H01F 30/00* (2006.01)
*H01B 3/18* (2006.01)

(56) References Cited

U.S. PATENT DOCUMENTS

2010/0079219 A1* 4/2010 Sakagami ................. H01P 5/12
333/125
2017/0171987 A1* 6/2017 Cleary ..................... B01J 31/06

* cited by examiner

WIRE, MANUFACTURING METHOD THEREFOR, AND COIL COMPONENT

BACKGROUND OF THE INVENTION

Field of the Invention

The present invention relates to a wire and a manufacturing method therefor and, more particularly, to a wire suitable for transmission of a high-frequency signal and a manufacturing method therefor. The present invention also relates to a coil component using such a wire.

Description of Related Art

Typically, as a wire used for a high-frequency coil component, a coated conducting wire in which the outer periphery of a core wire is covered with an insulating film is used. Japanese Patent Application Laid-open No. 2004-153079 discloses a coaxial wire in which the outer periphery of an insulating film is further covered with another conductor. In this wire, an outer periphery conductor is directly formed on the insulating film.

However, it is very difficult to uniformly form the outer periphery conductor directly on the insulating film. Further, the wire disclosed in Japanese Patent Application Laid-open No. 2004-153079 uses a core wire and an outer periphery conductor as different signal paths, so that there is no change in terms of high-frequency characteristics (particularly, AC resistance in a high-frequency band) of the core wire part as compared with a case where an ordinary coated conducting wire is used.

SUMMARY

It is therefore an object of the present invention to provide an easy-to-manufacture coaxial wire.

Another object of the present invention is to provide a coil component whose AC resistance in a high-frequency band is improved by using the coaxial wire.

A wire according to the present invention includes a core wire made of a conductor, an insulating film covering the outer periphery of the core wire, a catalyst adsorption film covering the outer periphery of the insulating film and including a catalyst serving as the reaction start point of electroless plating, and an outer periphery conductor covering the outer periphery of the catalyst adsorption film.

A wire manufacturing method according to the present invention includes a step of preparing a coated conducting wire having a structure in which the outer periphery of a core wire made of a conductor is covered with an insulating film and forming a catalyst adsorption film on the outer periphery of the coated conducting wire and a step of performing electroless plating with a catalyst absorbed to the catalyst adsorption film used as the reaction start point to form an outer periphery conductor on the outer periphery of the catalyst adsorption film.

According to the present invention, the catalyst adsorption film is formed on the outer periphery of the insulating film, so that it is possible to easily form an outer periphery conductor having a uniform film thickness by performing electroless plating.

In the present invention, polypyrrole is preferably used as the catalyst adsorption film. In this case, palladium can be adsorbed onto the catalyst adsorption film as a catalyst.

A coil component according to the present invention includes a winding core part, the above-described wire wound around the winding core part, a first terminal electrode connected in common with parts of the core wire and outer periphery conductor positioned at one end of the wire, and a second terminal electrode connected in common with parts of the core wire and outer periphery conductor positioned at the other end of the wire.

According to the present invention, the core wire and outer periphery conductor are short-circuited, so that it is possible to significantly reduce AC resistance in a high-frequency band by skin effect.

In the present invention, the wire is preferably wound with a space provided between each adjacent pair of turns on the winding core part. With this configuration, it is possible to prevent short circuit between each adjacent pair of turns without the need for forming a sufficient insulating film on the surface of the outer periphery conductor.

As described above, according to the present invention, a coaxial wire can be easily manufactured. Further, a coil component whose AC resistance in a high-frequency band is improved can be provided.

BRIEF DESCRIPTION OF THE DRAWINGS

The above and other objects, features and advantages of this invention will become more apparent by reference to the following detailed description of the invention taken in conjunction with the accompanying drawings, wherein.

DETAILED DESCRIPTION OF THE EMBODIMENTS

Preferred embodiments of the present invention will now be explained in detail with reference to the drawings.

Figure 1:
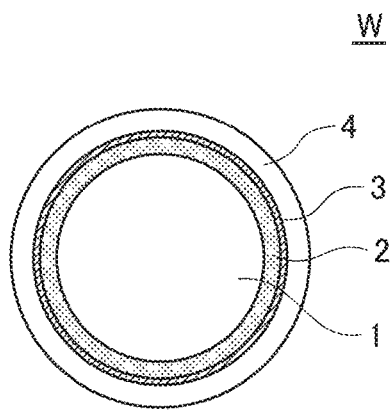
FIG. 1 is a cross-sectional view for explaining the structure of a wire according to a preferred embodiment of the present invention.

FIG. 1 is a cross-sectional view for explaining the structure of a wire W according to a preferred embodiment of the present invention.

As illustrated in FIG. 1, the wire W according to the present embodiment has a four-layer structure including a core wire 1 made of a conductor, an insulating film 2 covering the outer periphery of the core wire 1, a catalyst adsorption film 3 covering the outer periphery of the insulating film 2, and an outer periphery conductor 4 covering the outer periphery of the catalyst adsorption film 3.

The core wire 1 is a thin wire made of a good conductor such as copper (Cu), and the surface thereof is covered with the insulating film 2. The diameter of the core wire 1 is, e.g., about 20 μm to about 100 μm. The insulating film 2 is made of an insulating material such as imide-modified polyurethane. An ordinary wire is a coated conducting wire including the core wire 1 and insulating film 2; on the other hand, in the wire W according to the present embodiment, the outer periphery of the insulating film 2 is covered with the catalyst adsorption film 3, and the outer periphery of the catalyst adsorption film 3 is covered with the outer periphery conductor 4.

The catalyst adsorption film 3 is made of a resin containing a catalyst serving as the reaction start point of electroless plating. Although not particularly limited, polypyrrole is preferably used as a material for the catalyst adsorption film 3. Using polypyrrole as a material for the catalyst adsorption film 3 allows the catalyst adsorption film 3 to adsorb palladium as the catalyst serving as the reaction start point of electroless plating.

The outer periphery conductor 4 is a plated layer covering the outer periphery of the catalyst adsorption film 3, and is, e.g., about 1.0 μm to about 5.0 μm in thickness. Copper (Cu) is preferably used as a material for the outer periphery conductor 4, and rustproof coating or insulating film may be applied to the surface of the outer periphery conductor 4. As described above, the wire W according to the present embodiment has a coaxial structure including the core wire 1 and outer periphery conductor 4.

The following describes the manufacturing method for the wire W according to the present embodiment.

Figures 2A, 2B:
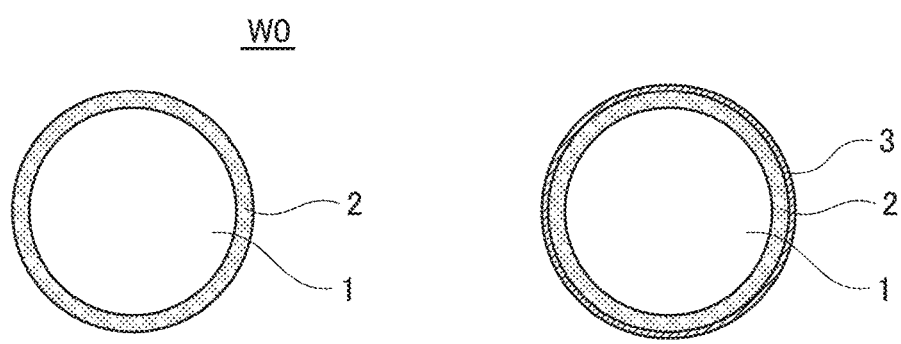
FIGS. 2A and 2B are process diagrams for explaining a method of manufacturing the wire.

First, a coated conducting wire W0 illustrated in FIG. 2A is prepared. The coated conducting wire W0 has a structure in which the outer periphery of the core wire 1 is covered with the insulating film 2 and is generally used as a wire for a high-frequency coil and the like. As described later, the wire W according to the present embodiment preferably uses the core wire 1 and outer periphery conductor 4 as a common conductor. In such an application, the necessity for sufficiently securing insulation between the core wire 1 and the outer periphery conductor 4 is low, so that the film thickness of the insulating film 2 may be smaller than that of the insulating film 2 in a typical coated conducting wire.

Subsequently, as illustrated in FIG. 2B, the catalyst adsorption film 3 is formed on the outer periphery of the coated conducting wire W0. As described above, polypyrrole is preferably used as a material for the catalyst adsorption film 3 and, in this case, palladium is adsorbed onto the catalyst adsorption film 3 as the catalyst serving as the reaction start point of electroless plating. The adsorption may be performed in a raw material state before formation of the catalyst adsorption film 3 or after formation of the catalyst adsorption film 3. Even when polypyrrole is used as a material for the catalyst adsorption film 3, another resin material or the like may be added for control of physical properties.

Then, electroless plating is performed with the catalyst adsorbed onto the catalyst adsorption film 3 as the reaction start point. As a result, a plated layer having a substantially uniform film thickness is formed on the outer periphery of the catalyst adsorption film 3. The obtained plated layer may be used as the outer periphery conductor 4 as it is, or a layer obtained by increasing the plating thickness through further electroplating using the plated layer as a substrate conductor may be used as the outer periphery conductor 4.

By the processes described above, the wire W according to the present embodiment is completed. As described above, in the manufacturing process of the wire W, the catalyst adsorption film 3 is utilized to form the outer periphery conductor 4 by plating, thereby making it possible to easily form the outer periphery conductor 4 having a uniform film thickness.

Figure 3:
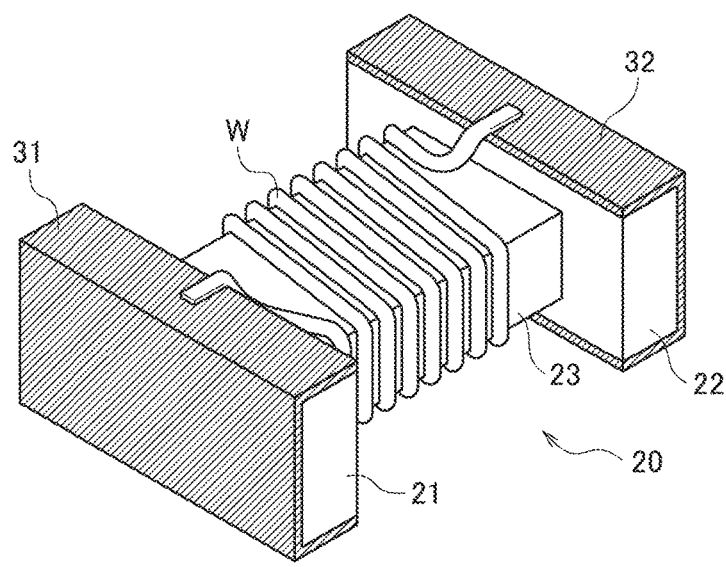
FIG. 3 is a schematic perspective view illustrating the configuration of a coil component using the wire according to the embodiment.

FIG. 3 is a schematic perspective view illustrating the configuration of a coil component 10 using the wire W according to the present embodiment.

The coil component 10 illustrated in FIG. 3 includes a drum-shaped core 20 having first and second flange parts 21 and 22 and a winding core part 23 connecting the first and second flange parts 21 and 22 and the wire W wound around the winding core part 23 of the core 20. The core 20 is made of a magnetic material having a comparatively high permeability, such as an Ni—Zn based ferrite and has a structure in which the first and second flange parts 21 and 22 and the winding core part 23 are integrated.

As illustrated in FIG. 3, first and second terminal electrodes 31 and 32 are formed in the first and second flange parts 21 and 22, respectively. The first and second terminal electrodes 31 and 32 may be conductors directly formed on the surfaces of the respective first and second flange parts 21 and 22 by using a conductive paste or the like or terminal metal fittings mounted to the respective first and second flange parts 21 and 22.

The first terminal electrode 31 is connected with one end of the wire W, and the second terminal electrode 32 is connected with the other end of the wire W. The first terminal electrode 31 is connected in common with parts of the core wire 1 and outer periphery conductor 4 positioned at the one end of the wire W, and the second terminal electrode 32 is connected in common with parts of the core wire 1 and outer periphery conductor 4 positioned at the other end of the wire W. That is, in the present embodiment, the core wire 1 and the outer periphery conductor 4 do not receive separate signals, but they receive the same signal as parallel wires.

The outer periphery conductor 4 has a film thickness as small as, e.g., about 1 μm to about 5 μm and thus has a higher DC resistance than the core wire 1. Therefore, even when the core wire 1 and the outer periphery conductor 4 are used as parallel wires, the DC resistance of the outer periphery conductor 4 is not significantly reduced as compared with the DC resistance of the core wire 1 alone. However, skin effect occurs in a high-frequency band, so that the AC resistance of the outer periphery conductor 4 having a large surface area is significantly reduced. Thus, when the core wire 1 and the outer periphery conductor 4 are used as parallel wires, the AC resistance of the outer periphery conductor 4 is significantly reduced (reduced to about ½ of the AC resistance of the core wire 1 alone). It is necessary to significantly (about twice) increase the diameter of the core wire 1 in order to obtain the same AC resistance by the core wire 1 alone. However, in the present embodiment, the core wire 1 and the outer periphery conductor 4 are used as parallel wires, so that it is possible to significantly reduce the AC resistance without increasing the diameter of the core wire 1.

To connect the core wire 1 and the outer periphery conductor 4 in common to the same terminal electrode, the one and the other ends of the wire W are thermocompression-bonded or laser-welded to their corresponding terminal electrodes. As a result, at the heated part, the insulating film 2 and catalyst adsorption film 3 existing between the core wire 1 and the outer periphery conductor 4 are melted and modified, and thus the core wire 1 and the outer periphery conductor 4 are short-circuited at the wire connection portion, whereby they are connected in common to their corresponding terminal electrodes 31 and 32, respectively.

The surface of the outer periphery conductor 4 constituting the outermost layer of the wire W may be exposed directly outside or may be covered with an insulating film. When the surface of the outer periphery conductor 4 is exposed directly, it is necessary to wind the wire W with a space provided between each adjacent pair of turns on the winding core part 23, as illustrated in FIG. 3. This prevents short-circuit between the outer periphery conductors 4 of the adjacent turns, so that it is possible to obtain desired coil characteristics. Even when the surface of the outer periphery conductor 4 is covered with the insulating film, the wire W may be wound with a space provided between each adjacent pair of turns. In this case, it is possible to reliably prevent short circuit between each adjacent pair of turns even when the film thickness of the insulating film is very small or insulation performance is insufficient.

It is apparent that the present invention is not limited to the above embodiments, but may be modified and changed without departing from the scope and spirit of the invention.

For example, the coil component 10 illustrated in FIG. 3 is a two-terminal inductance element using only one wire W; however, the application of the wire according to the present invention is not limited to such a coil component, but the wire may also be used for a coil component using a plurality of wires, such as a common-mode filter.

What is claimed is:

1. A wire comprising:
   a core wire made of a conductor;
   an insulating film covering an outer periphery of the core wire;
   a catalyst adsorption film covering an outer periphery of the insulating film, the catalyst adsorption film including a catalyst serving as a reaction start point of electroless plating; and
   an outer periphery conductor covering an outer periphery of the catalyst adsorption film,
   wherein the catalyst adsorption film includes polypyrrole.

2. The wire as claimed in claim 1, wherein a diameter of the core wire is 20 μm to 100 μm.

3. The wire as claimed in claim 2, wherein a thickness of the outer periphery conductor is 1.0 μm to 5.0 μm.

4. A method of manufacturing a wire, the method comprising:
   preparing a coated conducting wire having a structure in which an outer periphery of a core wire made of a conductor is covered with an insulating film;
   forming a catalyst adsorption film on an outer periphery of the coated conducting wire; and
   performing electroless plating with a catalyst absorbed to the catalyst adsorption film used as a reaction start point to form an outer periphery conductor on an outer periphery of the catalyst adsorption film; and
   performing an electroplating on the outer periphery conductor.

5. The method of manufacturing the wire as claimed in claim 4, wherein the forming the catalyst adsorption film includes:
   forming a raw material of the catalyst adsorption film that is substantially free from the catalyst on the outer periphery of the coated conducting wire; and
   adding the catalyst to the raw material to form the catalyst adsorption film.

6. A wire comprising:
   a core wire made of a conductor;
   an insulating film covering an outer periphery of the core wire;
   a catalyst adsorption film covering an outer periphery of the insulating film, the catalyst adsorption film including a catalyst serving as a reaction start point of electroless plating; and
   an outer periphery conductor covering an outer periphery of the catalyst adsorption film,
   wherein the insulating film is thinner than the outer periphery conductor.

7. The wire as claimed in claim 6, wherein the catalyst adsorption film includes polypyrrole.

8. The wire as claimed in claim 6, wherein a thickness of the outer periphery conductor is 1.0 μm to 5.0 μm.

9. The wire as claimed in claim 8, wherein a diameter of the core wire is 20 μm to 100 μm.

10. The wire as claimed in claim 8, wherein the outer periphery conductor is a plated layer.

* * * * *